United States Patent
Lavallee

(10) Patent No.: US 9,670,331 B2
(45) Date of Patent: Jun. 6, 2017

(54) POLY VINYL CHLORIDE FOAM PROMOTERS

(75) Inventor: Paul R. Lavallee, Berwyn, PA (US)

(73) Assignee: PMC ORGANOMETALLIX, INC., Wilmington, DE (US)

(*) Notice: Subject to any disclaimer, the term of this patent is extended or adjusted under 35 U.S.C. 154(b) by 0 days.

(21) Appl. No.: 13/119,558

(22) PCT Filed: Sep. 16, 2009

(86) PCT No.: PCT/US2009/057096
§ 371 (c)(1),
(2), (4) Date: Mar. 17, 2011

(87) PCT Pub. No.: WO2010/033549
PCT Pub. Date: Mar. 25, 2010

(65) Prior Publication Data
US 2011/0172320 A1  Jul. 14, 2011

Related U.S. Application Data

(60) Provisional application No. 61/097,961, filed on Sep. 18, 2008.

(51) Int. Cl.
*C08J 9/06* (2006.01)
*C08J 9/00* (2006.01)

(52) U.S. Cl.
CPC .............. *C08J 9/06* (2013.01); *C08J 9/0052* (2013.01); *C08J 2327/06* (2013.01)

(58) Field of Classification Search
CPC ......... C08J 9/0052; C08J 9/06; C08J 2327/06
USPC ............................................. 521/92, 93, 145
See application file for complete search history.

(56) References Cited

U.S. PATENT DOCUMENTS 3,640,953 A * 2/1972 Brecker et al. ............... 524/181
3,953,385 A   4/1976 Dworkin
4,042,556 A * 8/1977 Yoshinaga ..................... 521/59
4,369,126 A * 1/1983 Bathgate ......................... 516/11
4,977,193 A * 12/1990 Croce et al. .................... 521/85
5,264,462 A   11/1993 Hodson et al.
5,710,188 A   1/1998 Beekman et al.
5,753,719 A   5/1998 Beekman et al.
5,783,613 A   7/1998 Beekman et al.
5,786,399 A   7/1998 Beekman et al.
5,821,274 A   10/1998 Martin
5,866,625 A   2/1999 Beekman et al.
6,031,047 A   2/2000 Brady et al.
6,348,512 B1  2/2002 Adriani
6,465,099 B1  10/2002 Yamane et al.

OTHER PUBLICATIONS

International Search Report and Written Opinion dated Oct. 29, 2009; International Application No. PCT/US2009/057096; International Filing Date: Sep. 16, 2009; 7 pages.
International Preliminary Report on Patentability dated Mar. 22, 2011; International Application No. PCT/US2009/057096; 5 pages.
Office Action dated Jun. 29, 2015; Canadian Application No. 2,737,471; 4 pages.
First Office Action dated Jul. 2, 2012; Chinese Application No. 200980136977.3; 11 pages.
Second Office Action dated Jul. 5, 2013; Chinese Application No. 200980136977.3; 11 pages.
Extended European Search Report; Dated: Jul. 11, 2013; European Application No. 09815088.1; 6 pages.

* cited by examiner

*Primary Examiner* — Irina S Zemel
(74) *Attorney, Agent, or Firm* — Garvey, Smith, Nehrbass & North, L.L.C.; Mackenzie D. Rodriguez; Seth M. Nehrbass

(57) ABSTRACT

The density of rigid foamed articles made by the thermal decomposition of a blowing agent in a vinyl chloride polymer is reduced by the use of a tin based blowing agent activator(s). The tin based activator also reduces the activation temperature of a chemical blowing agent, allowing for more optimal evolution of gas during plastic processing. Dibutyl tin oxide or tin maleates are superior activators of vinyl chloride polymer blowing agents.

11 Claims, No Drawings

POLY VINYL CHLORIDE FOAM PROMOTERS

CROSS-REFERENCE TO RELATED APPLICATIONS

This application is a national stage application under 35 U.S.C. §371 of PCT/US2009/057096, filed Sep. 16, 2009, which claims benefit to U.S. Provisional Application No. 61/097,961, filed on Sep. 18, 2008, all of which are hereby incorporated by reference.

FIELD OF THE INVENTION

The present invention relates to the preparation of cellular vinyl chloride polymers. It relates more particularly to certain tin compounds that are superior activators for blowing agents employed in the preparation of cellular vinyl chloride polymers.

BACKGROUND OF THE INVENTION

One important utility for vinyl chloride resins is in the preparation of rigid foamed articles. The articles are manufactured by known methods such as extrusion of a blend of the resin and additives with a suitable chemical blowing agent and choosing the processing temperature such that it is above the decomposition temperature of the blowing agent. The bubbles of gas evolved by the blowing agent are entrapped within the molten resin, thereby forming a cellular structure that are commercially useful articles such as pipe, decorative molding, trimboard, and structural siding. Usually, the polymer is melted at a temperature between 150° and 200° C. and it is necessary to include a stabilizer in the formulation for the purpose of eliminating or at least minimizing the heat-induced discoloration of the vinyl chloride polymer which would otherwise occur at these temperatures. Also, when the decomposition temperature of the blowing agent is much above the processing temperature, activators are employed to hasten the decomposition of the blowing agent and/or lower the blowing agent decomposition temperature. The combination of a blowing agent and an activator increases both the degree and the rate of blowing agent decomposition and potentially the process window of the decomposition. The resultant larger volume of gas generated is desirable, since it reduces the amount of blowing agent required, or can result in lower density foam at similar blowing agent use levels.

It is known that a variety of organotin compounds, particularly dibutyltin derivatives of mercaptocarboxylic acid esters, will impart useful levels of heat stability to vinyl chloride polymers. It is also known that organotin chlorides work well by themselves or in combination with organotin carboxylates as activators for typical blowing agents such as azodicarbonamides, 5-phenyl tetrazole, and benzene sulfonylhydrazide.

DETAILED DESCRIPTION OF THE INVENTION

The present invention relates to the use of certain tin compounds as activators for blowing agents employed in the preparation of cellular vinyl chloride polymers. The activators of the present invention effectively lower the blowing agent decomposition temperature and increase the rate of blowing agent decomposition thereby enhancing the effect of the blowing agent, which could be evidenced by increased foam thickness and decreased foam specific gravity. The tin compound activators of the present invention also can replace, augment or reduce the need for commonly used additives such as ZnO and oxybisbenzenesulfonyl hydrazide (OBSH). ZnO and OBSH, which are often added to lower the activation temperature of exothermic blowing agents. The tin compounds of the present invention can also serve as a stabilizer in concert with or in place of other stabilizers in the cellular vinyl chloride polymer composition. When the tin compounds are serving a "dual" purpose of activator and stabilizer, higher concentration would typically be used. All percentages herein are by weight unless specified otherwise.

Vinyl chloride polymers are made from monomers consisting of vinyl chloride alone or a mixture of monomers comprising, preferably, at least about 70% by weight based on the total monomer weight of vinyl chloride. They are exemplified by copolymers of vinyl chloride with from about 1 to about 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride ((86:13:1), vinyl chloride-vinylidene chloride (95:5); vinyl chloride-diethyl fumarate (95:5), and vinyl chloride 2-ethylhexyl acrylate (80:20).

The vinyl chloride polymers constitute the major portion of the compositions of this invention. Thus, they amount to from about 70% to about 95% by weight of the total weight of the unfoamed compositions of this invention.

The blowing agent may be any one or a mixture of those commonly used for foaming PVC, including azobisformamide (also commonly known as azodicarbonamide), 5-phenyl tetrazole, benzene sulfonyl hydrazide, citric acid, sodium bicarbonate and mixtures thereof. The concentration of the blowing agent is typically from about 0.1 to about 5.0% by weight of the total composition prior to the formation of foam.

The blowing agent activator of the present invention comprises a tin compound including but not limited to dibutyl tin oxide and tin maleates. The activator helps the nitrogen-containing, carbon dioxide containing, and other decomposition type blowing agent to decompose faster and to generate more gases. The activator lowers the temperature for the decomposition of the blowing agent as well as provides for more complete decomposition of the blowing agent. The effect of the blowing agent activator is independent of whether it is added to the vinyl chloride polymer as an aqueous solution, as part of a stabilizer package, as part of a lubricant package, or as part of an additive package. A variety of conventional molding and extruding techniques may be used to form the rigid, cellular vinyl chloride polymers of this invention into pipe or any desired profile or a sheet.

Examples of suitable activators include tin salts of monocarboxylic acids and organo-tin stabilizers. Examples of such organo-tin stabilizers include without limitation: dibutyltin dilaurate, dibutyltin maleate, di(n-octyl) tin maleate, dibutyltin bis(lauryl mercaptide), dibutyltin, S,S-bis(isooctyl thioglycoate), dibutyltin β-mercaptoproprionate, di-n-octyltin S,S-bis(isooctyl thioglycolate), dibutylin tin oxide, dibutyl tin dilaurate, di-n-octyltin β-mercaptoproprionate, the reaction product of maleic anhydride, stearyl alcohol, water, and dibutyl tin oxide and mixtures thereof. The activator may be included in any amount useful to cause the activation. Generally, when serving only as an activator, from about 0.001 to 5 wt % of activator may be included in the chemical blowing agent composition comprising the chemical blowing agent and the blowing agent activator. However, when serving as a combination tin stabilizer and activator, the activator can be used at concentrations of from about 0.01 wt % to 10 wt % of the blowing agent composition. The blowing agent composition can be used at concentrations of from about 0.1 wt % to 10 wt % of the overall PVC composition. Alternatively, the activator/stabilizer can be combined directly with the PVC resin at concentrations of from about 0.1-10.0 parts per 100 parts (phr) PVC resin, typically in the 2-3 phr range. The activator particles can range in size from about 5 microns to about 500 microns with a particle size range of from about 10 to 100 being preferred.

An exemplary tin maleate material can be prepared via the reaction of stearyl alcohol and a stoichiometric excess of maleic anhydride. The reaction product is then reacted with a stoichiometric excess of dibutyl tin oxide to provide a reaction product containing, in part, tin maleate materials, which can be used without further processing.

Vinyl chloride polymer foam compositions typically include a stabilizer in the un-foamed compositions of from about 0.1 to about 10% by weight. They may be incorporated into the compositions by admixing in an appropriate mill or mixer or by any of the other well-known methods that provide for the uniform distribution of the stabilizers throughout the composition.

In addition to the blowing agent and activator compositions, the vinyl chloride polymer compositions of the present invention may contain additives for the purpose of increasing resistance to oxidation, flame retardancy and impact resistance of the polymer. Pigments, fillers, dyes, ultraviolet light absorbing agents and the like may also be present. Conventional processing aids such as lubricants and acrylic resins can also be present.

Acrylic resins are employed in vinyl chloride polymer foam compositions as processing aids to improve melt elasticity and strength and to prevent the collapse of the cellular structure during processing. The amount of the acrylic resin can vary from about 2 to about 18 parts per hundred parts of the vinyl chloride polymer. The molecular weight of the acrylic resin may be in the range of from 300,000 to 7,500,000 but those having the higher molecular weights are preferred; resins having a molecular weight of 3,000,000 and higher are particularly preferred.

Antioxidants may be used in the vinyl chloride polymer foam compositions of the present invention. Typical antioxidants include phenols, particularly those wherein the positions adjacent to the carbon atom bearing the hydroxyl radical contain alkyl radicals as substituents. Phenols wherein this alkyl radical is sterically bulky, e.g. a tertiary butyl radical, are preferred.

A small amount, usually not more than 0.3%, of a metal release agent, such as an oxidized polyethylene, also can be included in the vinyl chloride polymer foam compositions of the present invention.

A high molecular weight process aid may be included in the foamable composition. High molecular weight process aids are used to provide melt elasticity or melt strength to the polymer melt formed within the extruder and high integrity of the foam cell walls during extrusion. High molecular weight process aids can be acrylic process aids or copolymers of styrene and acrylonitrile. Suitable high molecular weight process aids include those high molecular process aids known in the art. Acrylic process aids which can be used in the present invention include thermoplastic polymethyl methacrylate homo or copolymers with weight average molecular weights greater than 1,000,000; hard, glassy copolymers of styrene and acrylonitrile having a glass transition temperature in excess of 60° C. and a dilute solution viscosity greater than 1.5 as measured in methylethyl ketone at 4% concentration. Copolymers of styrene and an unsaturated nitrile containing more than 50% of said styrene and 10 to 40% of said nitrile are examples of the styrene acrylonitrile process aids. Preferably 10 parts of the styrene acrylonitrile copolymer are added to the composition per 100 parts of PVC polymer. Examples of suitable acrylic process aids include poly(methyl methacrylate). Generally, from about 2 to about 20 parts of the acrylic process aid are added per 100 parts of PVC.

The foamable composition preferably includes lubricants or lubricant mixtures as are known to those in the art. Suitable lubricants include for example various hydrocarbons such as paraffin; paraffin oils; low molecular weight polyethylene; oxidized polyethylene; amide waxes, metal salts of fatty acids; esters of fatty acids such as butyl stearate; fatty alcohols, such as cetyl, stearyl or octadecyl alcohol; metal soaps such as calcium or zinc salts of oleic acid; fatty amides of organic acids; polyol esters such ad glycerol monostearate, hexaglycerol distearate and mixtures thereof.

Examples of possible fatty acids to be used include but are not limited to stearic acid and calcium stearate. Examples of fatty amides of organic acids include stearamide, and ethylene-bis-stearamide. Since several lubricants can be combined in countless variations, the total amount of lubricant can vary from application to application. Optimization of the particular lubricant composition is not within the scope of the present invention and can be determined easily by one of ordinary skill in the art. Generally from about one to about ten parts of lubricant are added to the foamable composition per one hundred parts of PVC polymer.

The foamable composition preferably includes a metal release agent. An example of a metal release agent is a terpolymer of methylmethacrylate, styrene and butyl acrylate. Preferably 2.0 parts of this terpolymer per 100 parts of PVC polymer are added to the lubricant.

In addition, enhancing ingredients useful to enhance either the processing of PVC or the PVC foam product can be included in the foamable composition. These include for example but not limited to pigments, such as titanium dioxide, carbon black, and iron oxide, fillers such as calcium carbonate, silica, talc and the like, reinforcing agents such as glass fibers, and graphite fibers or glass spheres, other processing aids, impact modifiers, and alloying polymers and the like, antioxidants, antistatic agents. These enhancing ingredients can be added in an amount effective for the intended purpose. The amount and use would be within the purview of one of ordinary skill in the art and does not form part of this invention.

EXAMPLE 1

PVC Foam formulations were blended using a high intensity mixer, then cooled and allowed to fully equilibrate at ambient temperature. The formulations were then processed in a Cincinnati Milacron conical twin screw extruder having a 22/1 length to diameter ratio and employing an 8" wide jacketed sheet die. Pelletized chemical blowing agent was added to the extruder's feed throat through a calibrated gravimetric feeder. From the die, the PVC melt was allowed to freely expand/foam, commonly called the "Free Foam" extrusion process. The Foam Sheet was routed through three chilled rolls, in order to give the foam a skin-type surface. From there, the foam air-cooled while being routed over roller tables. Finally, the foam reached a puller, operated at a static speed, followed by a cutting table. The foam was extruded using the conditions stated in Table 1.

TABLE 1

| | | |
|---|---|---|
| Barrel Zone (° F.) | 1 | 355 |
| | 2 | 355 |
| | 3 | 375 |
| | 4 | 375 |
| Adaptor Zones (° F.) | 1 | 362 |
| | 2 | 362 |
| Die Zone (° F.) | 3-edges | 360 |
| | 4-side | 360 |
| | 5-center | 345 |
| | 6-side | 360 |
| Screw Oil (° F.) | | 355 |
| Die Jacket (° F.) | | 350 |
| Screw RPM | | 25 |
| Die Gap (inches) | | 0.260 |
| Roll Stack Temp (° F.) | | 95 |
| Line Speed (ft/min.) | | 1.5 |

The formulations tested are listed in Table 2. Within each group, the formulations are similar with the exception of the activator and stabilizer. Testing has shown that tin stabilizer concentrations within the range tested here does not statistically affect the key parameters measured here, namely foam specific gravity and sheet thickness. The extrusion results show that the tin maleate stabilizer/activator and the tin oxide activator to have a beneficial effect on specific gravity and sheet thickness.

EXAMPLE 2

The effect of tin activators was tested via gas yield testing. Gas yield testing is a common test within the chemical blowing agent (CBA) industry. It is used to measure the amount of gas evolved by CBA products and the temperature at which the gas begins to evolve, commonly referred to as activation temperature. In this test, different loadings of tin activators were mixed with a neat exothermic chemical blowing agent, azodicabonamide (CAS#123-77-3). The well-mixed sample was placed in a sample vial within a gas yield analyzer. This equipment heated the vial at a constant rate, while continuously tracking sample temperature and gas evolution from the sample.

As shown below in TABLE 3, when compared to the control, both the tin maleate and tin oxide have a clear effect on reducing the activation temperature of the CBA.

TABLE 3

| | Composition | | | | |
|---|---|---|---|---|---|
| | % Tin Maleate | % Tin Oxide | % Neat Azo. | Activation Temp | |
| | Nominal Particle Size | 100 microns | 100-200 microns | | deg C. | Delta vs. Control |
| Control | 0% | | 100 | 204 | N/A |
| | 0.5% | | 99.5% | 187 | (17) |
| | 1.0% | | 99.0% | 182 | (22) |
| | 5.0% | | 95.0% | 183 | (21) |
| | 10.0% | | 90.0% | 183 | (21) |
| | | 0.5% | 99.5% | 170 | (34) |
| | | 1.0% | 99.0% | 165 | (39) |
| | | 5.0% | 95.0% | 165 | (39) |
| | | 10.0% | 90.0% | 165 | (39) |
| | 5.0% | 5.0% | 90.0% | 177 | (27) |

This phenomena was also observed when a smaller particle size tin oxide was testing. As shown in TABLE 4, tin oxide works as an effective CBA activator over a variety of particle sizes.

TABLE 2

| | | | Group 1 | | | Group 2 | | Group 3 | | Group 4 | |
|---|---|---|---|---|---|---|---|---|---|---|---|
| | Formulation | Run# | A | B | C | D | E | F | G | H | I |
| PVC | K = 57 Resin | Start* | 100.00 | 100.00 | 100.00 | 100.00 | 100.00 | 100.00 | 100.00 | 100.00 | 100.00 |
| Lubricants | Calcium Stearate | 66 C.* | 0.70 | 0.70 | 0.70 | 0.70 | 0.70 | 0.70 | 0.70 | 1.30 | 1.30 |
| | 165 MP Wax | 66 C. | 1.00 | 1.00 | 1.00 | 1.00 | 1.00 | 1.00 | 1.00 | 1.00 | 1.00 |
| | Oxidized Polyethylene | 66 C. | 0.20 | 0.20 | 0.20 | 0.20 | 0.20 | 0.20 | 0.20 | 0.20 | 0.20 |
| Stabilizer/ | Methyl Tin Stabilizer | Start | 3.00 | — | — | — | 3.00 | — | — | — | 2.00 |
| Activator | Butyl Tin Stabilizer | Start | — | 2.14 | — | 2.14 | — | 2.14 | — | 3.20 | — |
| | Tin Maleate Stabilizer/Activator | Start | — | — | 3.00 | — | — | — | 3.00 | — | — |
| | Tin Oxide Activator | 98 C. | — | 0.50 | — | — | 0.50 | — | — | — | 0.50 |
| Acrylic | High MW Acrylic Process Aid | 72 C. | 10.00 | 10.00 | 10.00 | 7.00 | 7.00 | 7.00 | 10.00 | 7.00 | 7.00 |
| | Low MW Acrylic Process Aid | 72 C. | 2.00 | 2.00 | 2.00 | 2.00 | 2.00 | 2.00 | 2.00 | 2.00 | 2.00 |
| CaCO3 | nominal 0.7 um particle size | 88 C. | 5.00 | 5.00 | 5.00 | — | — | 5.00 | 5.00 | — | — |
| | nominal 0.07 um particle size | 88 C. | — | — | — | 5.00 | 5.00 | — | — | 5.00 | 5.00 |
| Titanium Dioxide | | 98 C. | 4.00 | 4.00 | 4.00 | 4.00 | 4.00 | 4.00 | 4.00 | 4.00 | 4.00 |
| Pelletized CBA (nominal phr) | | On-line | 0.85 | 0.85 | 0.85 | 0.85 | 0.85 | 0.65 | 0.65 | 0.65 | 0.65 |
| Results | Specific Gravity in water (ASTMD792) | | 0.734 | 0.661 | 0.610 | 0.705 | 0.707 | 0.783 | 0.679 | 0.799 | 0.751 |
| | Sheet Thickness | inches | 0.724 | 0.762 | 0.791 | 0.691 | 0.708 | 0.687 | 0.781 | 0.646 | 0.663 |

*Addition Temperature to high intensity blender

TABLE 4

| | Composition | | | |
|---|---|---|---|---|
| | % Tin B - Fine PSD | % Neat Azo | Activation Temp | |
| Nominal Particle Size | $D_{50}$ = 12 um | | deg C. | Delta vs. Std |
| Control | 0.00% | 100.00% | 203 | N/A |
| | 0.05% | 99.95% | 185 | (18) |
| | 0.25% | 99.75% | 180 | (23) |
| | 0.50% | 99.50% | 174 | (29) |
| | 0.75% | 99.25% | 168 | (35) |
| | 1.00% | 99.00% | 166 | (37) |

EXAMPLE 3

Tin oxide was used in a chemical blowing agent (CBA) composite which included an alternate activator/blowing agent, oxybisbenzenesulfonylhydrazide (OBSH, CAS#80-51-3). The use of the tin activator of the present invention may allow the use of a lower concentration of the alternate activator/blowing agent, that is exothermic in nature. This CBA composite also contained other tin-based stabilizer compounds, and a methyl tin mercaptide, known commercially as THERMOLITE® 161, available from Arkema Inc. The tin oxide-containing CBA in accordance with the present invention was evaluated in a PVC foam extrusion study. In this study, it was compared to a commercially available blowing agent that contained OBSH and azodicarbonamide to determine its effect on foam density and color development.

A common issue in the PVC Foam Industry is the yellowing of the foam article's core. This can be due to a variety of reasons, including self-heat from the molten foam, heat from the exothermic decomposition of a blowing agent or the exothermic decomposition of an activator, and by-products of blowing agent decomposition. If the decomposition of the blowing agent activates at a lower temperature, one potential outcome would be a decrease in exothermic heating of the PVC melt, and a potential to improve whiteness of the PVC article. Also, if the tin-based activator allows for a reduction in exothermic activator/blowing agent, one potential outcome would be a decrease in exothermic heating of the PVC melt and a decrease in activator/blowing agent decomposition byproducts, which could have a potential to improve whiteness of the PVC article.

TABLE 5 describes the PVC Foam formulation that was used. The formulation was processed on Cincinnati Milacron conical twin screw extruder, as described above in EXAMPLE 1. Several pelletized CBA's were tested. They were added to the extruder's feed throat via a calibrated volumetric feeder. The pelletized CBA's were added to ensure a constant CBA gas yield within the PVC Foam. The foam was extruded using the conditions stated in TABLE 6.

TABLE 5

| Component | phr |
|---|---|
| RPVC Resin (K57) | 100.0 |
| Methyltin Heat Stabilizer | 2.0 |
| Calcium Stearate | 0.7 |
| 165 MP Wax | 1.0 |
| Oxidized Polyethylene | 0.2 |
| High MW Acrylic Process Aid | 8.0 |
| Low MW Acrylic Process Aid | 2.0 |

TABLE 5-continued

| Component | | phr |
|---|---|---|
| CaCO3 - Ultrafine, Treated | | 5.0 |
| Titanium Dioxide | | 4.0 |

TABLE 6

| Barrel Zones Temp (° F.) | 1 | 355 |
|---|---|---|
| | 2 | 355 |
| | 3 | 375 |
| | 4 | 375 |
| Adapter Zones Temp (° F.) | 1 | 362 |
| | 2 | 362 |
| Die Zones Temp (° F.) | 3-edges | 360 |
| | 4-side | 355 |
| | 5-center | 359 |
| | 6-side | 355 |
| Screw Oil (° F.) | | 355 |
| Die Jacket Oil (° F.) | | 348 |
| Screw RPM | | 25 |
| % Screw Fill | | 75% |
| Die Gap (inch) | | 0.260 |
| Roll Stack Temp (° F.) | | 97 |
| Line Speed (ft/mini) | | 1.5 |
| Vacuum (inches Hg) | | 28 |

PVC Foam processing of the tin oxide-containing CBA was similar to the other CBA's. Additionally, the foam density values for foam produced with the tin oxide-containing CBA was similar to foam produced with other CBA's. To simulate the slow cooling of a thick PVC Foam sample several samples of each PVC foam lot were put in a laboratory oven held at a constant 190° C., which approximates the processing temperature of the PVC foam. Then, every 15 minutes, one sample of each PVC foam lot was removed. The tin oxide-containing CBA performed demonstrably better at reducing color development, as evidenced in the color readings of the samples, as shown in TABLE 7. In TABLE 7, the whiteness is higher (higher Hunter L value), early yellowness is lower (lower Hunter B value) and overall color change is less (lower Delta E) with the tin oxide composition in accordance with the present invention vs. the control composition.

TABLE 7

| | Control | Tin Oxide CBA | Control - Repeat |
|---|---|---|---|
| | Hunter L Value | | |
| Start | 89.16 | 89.97 | 89.63 |
| 15 min. | 89.73 | 89.52 | 90.00 |
| 30 min. | 88.83 | 89.98 | 88.39 |
| 45 min. | 86.83 | 89.31 | 76.57 |
| 60 min. | 71.53 | 87.09 | 63.33 |
| 75 min. | 61.28 | 76.73 | 54.01 |
| 90 min. | 55.68 | 72.57 | 51.58 |
| | Hunter b Value | | |
| Start | 4.90 | 4.23 | 3.74 |
| 15 min. | 6.56 | 5.01 | 5.85 |
| 30 min. | 9.50 | 8.11 | 8.53 |
| 45 min. | 13.80 | 10.26 | 13.37 |
| 60 min. | 13.68 | 13.83 | 13.41 |
| 75 min. | 13.24 | 17.75 | 12.94 |
| 90 min. | 12.74 | 17.33 | 12.15 |
| | Total Color Change - Delta E | | |
| Start | 0.00 | 0.00 | 0.00 |
| 15 min. | 1.84 | 0.95 | 2.15 |
| 30 min. | 4.61 | 3.96 | 5.09 |

TABLE 7-continued

|  | Control | Tin Oxide CBA | Control - Repeat |
|---|---|---|---|
| 45 min. | 9.34 | 6.23 | 16.50 |
| 60 min. | 19.73 | 10.13 | 28.06 |
| 75 min. | 29.13 | 18.95 | 37.04 |
| 90 min. | 34.75 | 21.88 | 39.40 |

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

The invention claimed is:

1. A composition for preparing rigid cellular vinyl chloride polymers, said composition consisting of:
   a. at least one vinyl chloride homopolymer or a copolymer comprising polymerized units of vinyl chloride and at least one ethylenically unsaturated monomer; and
   b. at least one blowing agent, and
   c. a blowing agent activator selected from the group consisting of dibutyl tin oxide; the reaction product of maleic anhydride, stearyl alcohol, water, and dibutyl tin oxide; and mixtures thereof.

2. The composition of claim 1 wherein said vinyl chloride homopolymer or vinyl chloride copolymer or mixtures thereof comprises from about 70% to about 95% by weight of said composition.

3. The composition of claim 1 wherein said blowing agent is selected from the group consisting of azobisformamide, 5-phenyl tetrazole, benzene sulfonyl hydrazide, citric acid, sodium bicarbonate and mixtures thereof.

4. The composition of claim 1 wherein said blowing agent comprises from about 0.1% to about 10.0% by weight of the composition.

5. The composition of claim 1 wherein said blowing agent activator comprises from about 0.01 wt % to about 10 wt % of said blowing agent composition.

6. The composition of claim 1 wherein the particle size of said blowing agent activator ranges from about 10 microns to about 100 microns.

7. The composition of claim 1 further consisting of from about 2 parts to about 18 parts acrylic resin per hundred parts of the vinyl chloride homopolymer or vinyl chloride copolymer or mixture thereof.

8. The composition of claim 1 wherein said blowing agent activator comprises from about 0.1 parts to about 10 parts per 100 parts of the vinyl chloride homopolymer or vinyl chloride copolymer or mixture thereof.

9. The composition of claim 1 wherein the particle size of said blowing agent activator ranges from about 5 microns to about 500 microns.

10. The composition of claim 1 wherein the copolymer of vinyl chloride comprises at least 70% by weight of vinyl chloride based on total momoner weight.

11. The composition of claim 1 wherein the copolymer of vinyl chloride comprises from 1 to 30% of a copolymerizable ethylenically unsaturated monomer selected from the group consisting of vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate, other alkyl acrylates, methyl methacrylate, ethyl methacrylate, butyl methacrylate, other alkyl methacrylates, methyl alpha-chloroacrylate, styrene, trichloroethylene, vinyl ethers, vinyl ketones 1-fluoro-2-chloroethylene, acrylonitrile, chloroacrylonitrile, allylidene diacetate and chloroallylidene diacetate.

* * * * *